UNITED STATES PATENT OFFICE.

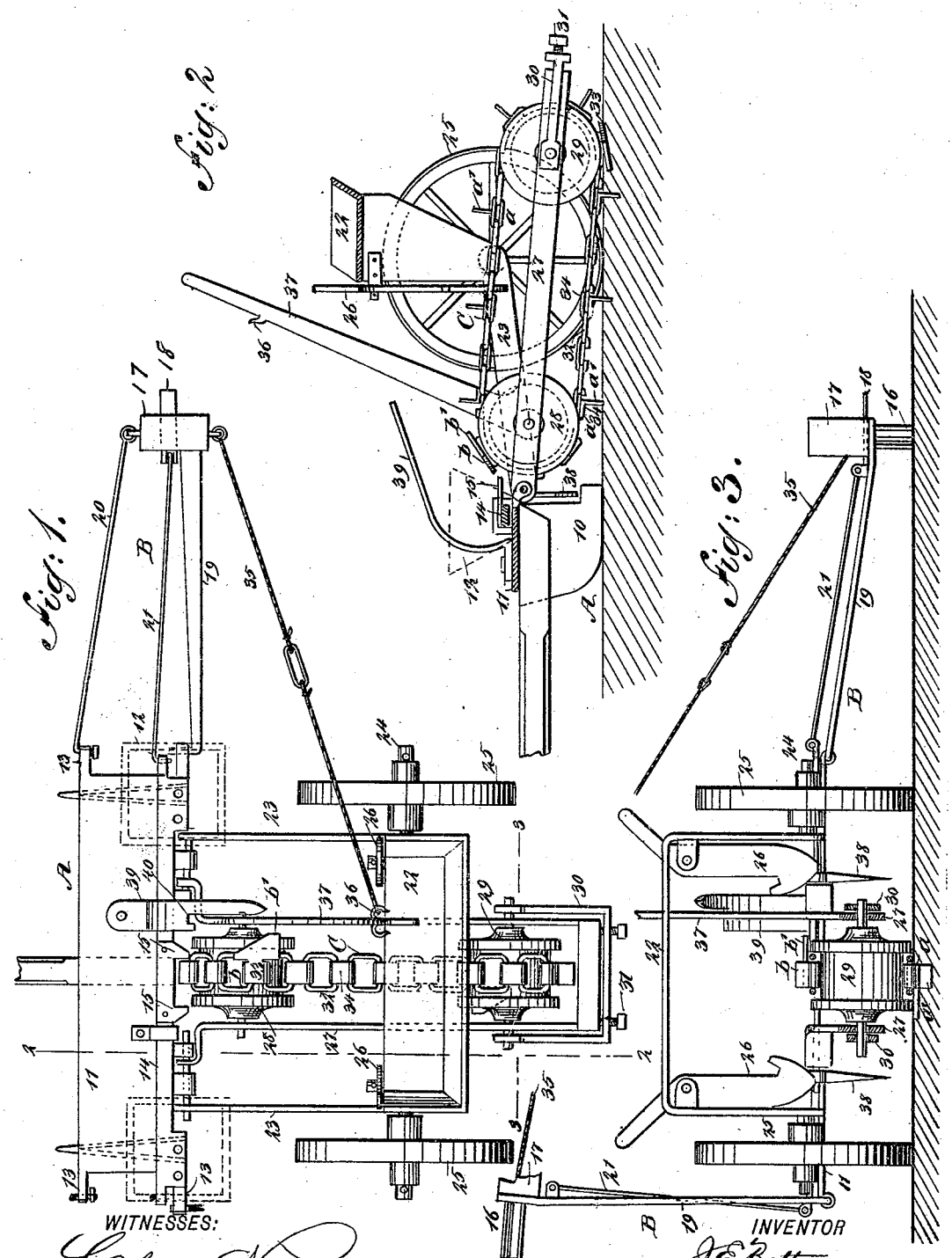

JAMES EDWIN BETTS, OF WILMINGTON, OHIO.

PLANTER.

SPECIFICATION forming part of Letters Patent No. 515,318, dated February 27, 1894.

Application filed April 12, 1893. Serial No. 470,030. (No model.)

*To all whom it may concern:*

Be it known that I, JAMES EDWIN BETTS, of Wilmington, in the county of Clinton and State of Ohio, have invented a new and useful Improvement in Planters, of which the following is a full, clear, and exact description.

My invention relates to an attachment to planters, and it has for its object to provide a simple means for regulating the drop of the seed to be planted, and likewise to provide a means whereby simultaneously with the dropping of the seed a marking material will be dropped from a marker.

Another feature of the invention consists in so constructing the machine that it can be successfully worked in fields where there are stumps or trees, or upon uneven ground.

Another object of the invention is to provide a means whereby the attachment will be completely under the control of the operator of the machine.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the machine. Fig. 2 is a longitudinal vertical section taken on the line 2—2 of Fig. 1; and Fig. 3 is a transverse section taken essentially on the line 3—3 of Fig. 1.

The usual sled A, comprises the front or body portion of the planter and attachment. The sled consists of runners 10 and a plate or platform 11, which connects the runners. The runners are illustrated in the drawings as being shaped to constitute shoes, the seed falling from the boxes 12, shown in dotted lines in Figs 1 and 2, and dropping to the ground between the runners. This feature is particularly shown in Fig. 1. The platform 11, extends beyond the outer faces of the runners, and each end of the platform is provided with two properly spaced ears 13, these ears being adapted as the medium for attaching the marker B, employed with the sled. Any approved form of drop slide 14, may be employed in connection with the seed boxes, but at the center of the drop slide two rearwardly projecting lugs 15, are formed, one being located at each side of the center, as is shown best in Fig. 1, and the outer edges of the projecting portions of these lugs are inwardly beveled, as shown in the same figure.

The marker proper comprises a shoe-like runner 16, adapted to travel upon the ground, and upon this runner a box 17, is erected, the said box being provided with a drop slide 18. This box is adapted to contain meal, chalk, coal dust, or any material that would render the location of a hill plainly visible upon the surface of the ground. The shoe is provided with two arms, designated respectively as 19 and 20, and these arms are pivotally connected, or have hinged connection with the lugs 13, projected from the ends of the platform of the sled, as shown best in Fig. 1, while the drop slide 18 of the marker is connected with the seed drop slide 14 through the medium of a connecting rod 21, the connecting rod having pivotal or hinged connection with both of the slides. It will be understood that one of these markers is located at each end of the sled.

The driver's seat 22, is provided with forwardly projecting arms 23, located one at each end of the seat, and these arms at their forward ends have pivotal or hinged connection with the platform of the sled. An axle 24, is attached to the rear end of each arm 23, and upon these axles the supporting wheels 25 of the attachment are loosely mounted. Near each end of the seat, upon its front edge, a hook-like lever 26, is fulcrumed, the levers extending well downward below the seat, and their handles project above the top of the seat, extending outwardly in opposite directions, so that they may be conveniently operated by the driver.

A frame 27, preferably of angular and skeleton construction, is hinged or pivoted at its forward end to the platform of the sled, and this frame is centrally located, being of such length as to extend rearward some distance beneath and beyond the driver's seat. In the forward end of the frame a drum 28, is journaled, and near the rear end of the frame a like drum 29, is also journaled. The trunnions of the rear drum pass through slots produced longitudinally in the sides of the frame 27, and are journaled in the forward ends of the yoke-like frame 30, the body of which frame extends across the back of the main or pivoted frame 27, and its members parallel with each side of said frame, as shown in Fig. 1; and the rear drum may be carried toward or from the forward drum a desired distance by the manipulation of the yoke bearing 30 of the rear drum; and the adjustment of this bearing is accomplished preferably through the medium of set screws 31, passed through the body of the bearing to a connection with the rear portion of the main frame 27. The forward drum 28 is journaled directly in the main frame. The two drums are adapted to carry an endless chain C; this chain is made by a series of ordinary links 32 and a series of links of peculiar construction, the latter links being in two widely different shapes, and they are adapted for different purposes. One set of these peculiar links is designated as 33, and is adapted to drive the seed drop slide, while the other set of links, designated as 34, is adapted to rotate the chain. The links 34, which are utilized to rotate the chain, are best shown in Fig. 2, in which it will be observed that they consist of a body portion $a$, open at one end to a certain extent in order to permit their ready connection with an ordinary link 32; and in addition to the body the said driving links consist of a spur $a'$, which extends outward at a right angle to the body. These spurs are adapted to enter the ground as the machine is drawn forward, and consequently will turn the entire belt; and when the machine is stationary and the belt is out of the ground, the spurs upon the uppermost stretch when pushed upon by the feet of the driver, will enable him to revolve the belt a desired distance when such action is necessary.

Any desired number of drop links 33, may be employed; ordinarily, however, two are used, and the distance that these two links are spaced from each other regulates the distance between the rows. The drop links comprise a body section $b$, partially open to receive the ordinary link, and a lateral extension $b'$, extending from one side of the body, which extension is practically a plate having its outer edge beveled more or less so that the plate is to an extent angular in plan view, as shown in Fig. 1. The drop links 33, are so placed that the extension $b'$ of one will be upon the right-hand side of the chain while the extension of the other will be upon the left-hand side, and as the chain is revolved, whenever an extension of a drop link engages with a lug upon the seed drop slide it will move the said slide either to the right or to the left according to the particular drop link that connects with the slide; and as the seed drop slide is in connection with the slide of the marking box the two slides will move together. But one marker B, is in operation at a time; the other marker is carried to a perpendicular position, as shown at the left in Fig. 3, and when the marker is in this position it is evident that the movement of the seed drop slide will have no action whatever upon the marking slide of that particular marker owing to the pivotal connection between the two slides. Each marker is provided with a rope or chain 35 connected with its rear outer portion, as shown in Fig. 1, and the ropes or chains at their inner ends are fastened upon hooks 36, formed upon the handle of a lever 37, which lever is attached to or is formed integral with one of the sides of the chain-carrying or main frame 27, and by pushing the lever 37 forward the frame 27 will be raised at its rear end, and consequently all of the chain spurs will be removed from the ground; and the frame may be held in its elevated position by causing the seat levers 26 to receive and support the lower edges of the frame. Between each seed box and the main frame 27 a tooth 38, is attached to the platform of the sled, as best shown in Fig. 3, and said teeth extend downward in direction of the ground. A bracket 39, is likewise attached to the platform of the sled at the right of the center, and this bracket extends upward and rearward from the platform, and is provided with a notch 40 in its inner side edge.

It will thus be observed that when the chain is removed from engagement with the ground the seed drop slide will not be operated, and that no power is required to operate the drop slide other than the chain, and it is revolved by engagement with the ground while the machine is being drawn over it.

The attachment may be made to any planter having any form of seed box or seed drop slide, but as there are many styles of planters the shape of the frame and the mode of attachment of the device may need to be changed from that shown in the drawings to effect a proper attachment to some of the planters.

When it is desired to make a turn, the lever 37 is pushed forward until the main frame 27, is lifted and engaged with the seat levers 26. The entire weight of the driver is then thrown rearward upon the seat and as much backward pressure as possible is exerted upon the lever 37; this action will raise the shoes and sled from the ground and will enable the machine to be turned and at the same time the seed drop slide will not be operated. Prior, however, to lifting the sled and chain from the ground, the marker that has been in use is elevated.

In planting ground in hills to be cultivated both ways, the first row is run across the most level portion of the field, and without a single change from the regular drop the machine is driven straight to the end of a row and stopped; the marker is then lifted and likewise the planter shoes and belt, as above described. The machine is then driven around so that when turned in an opposite direction the tooth 38, next to the rows planted will be directly over and point toward the mark made by the marker, and the tooth will also be directly over and point to the last deposit of the marking material dropped by the marker. When the planter is in this position the planter shoes and markers are made to engage with the ground, but the chain belt is pressed forward by the foot of the driver until it makes a drop, and at that time the belt is lowered to the ground and the machine is started off to plant another row. When planting the rows of corn it is necessary to drive in such manner that a tooth will be kept directly over and point to the mark made by the marker; and it is likewise necessary that the driver observe that the teeth are directly over and point toward drops of marking material deposited by the marker while each drop from the seed drop slide is being made.

It will be understood that the bracket 39, may be made of any desired shape which will enable it to hold the lever 37 when said lever is carried forward to raise the chain-carrying frame.

When a machine is constructed as above set forth, the drop may be made sooner or later than ordinary. This is a great advantage when passing over raised places or where the rows become longer and only the same number of hills may be made. When making a later drop the belt is simply lifted a little from the ground and a quicker drop may be made by kicking forward the upper strand of the chain.

Having thus described my invention, I claim as new and desire to secure by Letters Patent—

1. In a planter, the combination of runners, a platform connecting the runners extending beyond the said runners and provided with spaced ears, a seed drop slide, a shoe, a box on the shoe and provided with a drop slide, arms projecting from the shoe and pivoted to the ears of the platform, and a connecting rod connecting the said drop slides, substantially as described.

2. In a planter, the combination, with a sled, a seed drop slide held to slide upon the sled and provided with lugs projected rearwardly from each side of its center, a seat carrying frame pivotally connected with the sled, supporting wheels carried by the said frame, the seat extending rearward of the axles of the wheels, a central rearwardly extending frame pivotally connected with the sled, drums carried by the frame, one of which is adjustable, a lift lever connected with the central frame whereby the said frame is raised and lowered, levers located near the seat and adapted to support the central frame in an elevated position, and an endless chain carried by the frame, the said chain comprising links consisting of a body portion and spurs projected outwardly from the body and adapted for engagement with the ground, and also drop links, each of the latter comprising a body portion and a side extension adapted for engagement with a lug on the seed drop slide, the extensions of the drop links being alternately located upon opposite sides of the chain, as and for the purpose set forth.

3. In a planter, the combination with a seed hopper supporting frame, and the seed drop slide provided with spaced projections, of a seat frame mounted on wheels and hinged to the hopper supporting frame, a frame below the seat frame and hinged to the hopper supporting frame, drums mounted in the said frame, an endless chain passing around the drums and provided with lateral projections for operating the seed drop slide and with spurs for propelling the chain, and means for raising and lowering the frame, substantially as described.

4. In a planter, the combination with a sled carrying the hoppers, and the seed drop slide of the hoppers provided with spaced projections, of a seat frame mounted on wheels and hinged to the sled, a frame hinged to the sled and projecting in the rear of the seat frame, drums mounted in the frame, an endless chain provided with lateral projections for operating the seed drop slide and with propelling spurs, a lever secured to the chain carrying frame, and a bracket for locking the lever in position, substantially as described.

JAMES EDWIN BETTS.

Witnesses:
MILETUS GARNER,
J. C. SMITH.